United States Patent
Cartwright et al.

(10) Patent No.: US 12,026,409 B2
(45) Date of Patent: Jul. 2, 2024

(54) LABEL PRINTING APPARATUS

(71) Applicant: ILLINOIS TOOL WORKS INC., Glenview, IL (US)

(72) Inventors: Kevin Cartwright, Halesowen (GB); Balraj Brrang, Wolverhampton (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/362,362

(22) Filed: Jul. 31, 2023

(65) Prior Publication Data

US 2024/0045626 A1 Feb. 8, 2024

(51) Int. Cl.
*G06F 3/12* (2006.01)
*G01G 19/414* (2006.01)
*G06Q 10/087* (2023.01)

(52) U.S. Cl.
CPC ......... *G06F 3/121* (2013.01); *G01G 19/4144* (2013.01); *G06F 3/1234* (2013.01); *G06F 3/1236* (2013.01); *G06F 3/1257* (2013.01); *G06F 3/1286* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 2011/0240731 A1* | 10/2011 | Lee | G06Q 30/06 235/375 |
| 2014/0177604 A1* | 6/2014 | Lee | H04W 52/0212 370/336 |
| 2019/0333421 A1 | 10/2019 | Rao | |

FOREIGN PATENT DOCUMENTS

| | | | |
|---|---|---|---|
| EP | 3287890 A2 * | 2/2018 | G06F 3/147 |
| GB | 2604992 A | 9/2022 | |
| JP | 2001346663 A | 12/2001 | |
| WO | WO-2012095825 A2 | 7/2012 | |

* cited by examiner

*Primary Examiner* — Lennin R Rodriguezgonzalez
(74) *Attorney, Agent, or Firm* — THOMPSON HINE LLP

(57) ABSTRACT

A control module of a label printing apparatus includes memory configured to store item data and shelf label data indicative of an ID of an electronic shelf label (ESL) for the item, and at least one communication module configured to: receive, from an external device, an update request to make at least one change to the item data and communicate an ESL update request to the ESL to make the at least one change at the ESL. A processor of the control module is configured to: update the item data stored in the memory according to the update request; determine if the ESL has been updated in dependence on whether an acknowledgement is received from the ESL; and if the ESL has not been updated, control the communication module to output an alert signal to indicate that the ESL is out of sync with the label printing apparatus.

16 Claims, 5 Drawing Sheets

LABEL PRINTING APPARATUS

TECHNICAL FIELD

The present disclosure relates to a control module for a label printing apparatus, a label printing apparatus, a label printing system, and a computer-implemented method.

BACKGROUND

Supermarkets and other outlets may provide the facility for customers to package their own items. This facility allows customers to bring their own container to refill with the items in order to reduce packaging waste. However, the outlet may also provide packaging such as bags or the like into which the customer can package the items. This system can be implemented for various grocery items such as dried produce, cleaning products, fruits and vegetables or the like. Such items are displayed loose or in a bulk container in contrast to being individually portioned. Because the quantity of the item purchased by the customer may fluctuate depending on the size of container used by the customer, these items are typically be charged by unit, e.g., by weight or volume. The item is therefore displayed with a label indicating the price per unit weight or volume. The customer may then fill their container and weigh the container at a label printing apparatus. The apparatus then prints a label for the customer to reflect the amount of the item taken, for scanning at the point of sale. This label may include item data including the total price, the weight of the item, any allergen information for the item and the like.

In order to easily facilitate fluctuation in item data such as price or ingredients, electronic shelf labels (ESLs) may be used in place of paper labels where the item is displayed. These ESLs may display information such as the type of item, the price per unit and any allergen information. The ESLs may then be communicably connected to an external device such as a remote server which manages the information displayed on the ESLs.

When item data changes, both the ESL and the label printing apparatus must be concurrently updated to reflect the new item data, such as a new price or a new allergen. The remote server may thus transmit updates to both the ESL and the label printing apparatus. However, if the ESL malfunctions and fails to update, the item data stored in the label printing apparatus will not be synchronised with that displayed at the ESL. Thus, the label printed will not reflect the information displayed to the customer at the ESL.

Examples disclosed herein may address one or more of the above problems.

SUMMARY

In an aspect, there is provided a control module for a label printing apparatus, comprising: a memory configured to store item data associated with an item and shelf label data indicative of an ID of an electronic shelf label (ESL) for the item; at least one communication module configured to: receive, from an external device, an update request to make at least one change to the item data, and communicate an ESL update request to the ESL indicated in the shelf label data to make the at least one change at the ESL; and a processor configured to: update the item data stored in the memory according to the update request; determine if the ESL has been updated in dependence on whether an acknowledgement is received from the ESL; and if the ESL has not been updated, control the communication module to output an alert signal to indicate that the ESL is out of sync with the label printing apparatus.

The external device may be a server computer, or the like, located remotely from the label printing apparatus. Advantageously, routing updates for the ESL via the label printing apparatus means the label printing apparatus can keep track of whether the ESL has successfully updated and so can flag and prevent inconsistencies between the label printing apparatus and the ESL.

Optionally, if the ESL has not been updated, the communication module is arranged to output the alert signal to a user interface associated with the label printing apparatus, wherein the alert signal is configured to cause the user interface to output an indication to a user that the ESL is out of sync with the label printing apparatus. For example, the user interface may comprise a display, and so the output indication may be a visual indication.

Optionally, the communication module is arranged to output the alert signal to a remote device. The remote device may be the external device from which the update request was received. The alert signal may comprise an indication of the ID of the ESL, wherein the alert signal is configured to provide a request for maintenance at the indicated ESL.

Optionally, the processor is configured to: determine whether the acknowledgement is received from the ESL within a predetermined time from the communication of the ESL update request, and if the acknowledgement is not received within the predetermined time, determine that the ESL has not been updated. Optionally, the processor is configured to determine that the ESL has been updated if the acknowledgement is received within the predetermined time.

Optionally, the shelf label data comprises an address associated with the ESL in a local area network, and the communication module is configured to communicate the ESL update request to the address via the local area network. For example, the communication module may be configured to communicate the ESL update request via Wi-Fi communication or other wireless communication. This communication may be via one or more access points (APs) associated with the ESL in the local area network.

Optionally, the item data is indicative of one or more of: a price of the item, a list of ingredients in the item, or allergen information for the item. The update request may be indicative of at least one change to the price of the item, the list of ingredients in the item, or the allergen information for the item.

Optionally, the at least one communication module is configured to: receive a label generation request indicating the item to be labelled; and communicate a print signal to a label printing device to cause the label printing device to print an information label for the item in dependence on the updated item data. Optionally, the processor is configured to inhibit the communication of the print signal if the ESL has not been updated. Optionally, the communication module is configured to receive item weight data indicative of a measured weight of the item from a weighing scale associated with the label printing apparatus, and the processor is configured to determine a content of the information label in dependence on the item data and the item weight data.

According to another aspect there is provided a label printing apparatus comprising: the control module of the above aspects, an user interface configured to receive a user input and transmit a label generation request to the control module in dependence on the received user input; and a label printing device communicably coupled to the control module, the label printing device configured to receive the print signal from the control module and print an information label in dependence on receipt of the print signal. Optionally, the label printing apparatus comprises a weighing scale.

According to another aspect there is provided a label printing system for an item in a retail setting, the label printing system comprising: an electronic shelf label (ESL) associated with an item, wherein the electronic shelf label (ESL) comprises a communication module, a memory for storing second item data associated with the item, and a display for displaying an indication of the second item data; and a label printing apparatus, wherein the label printing apparatus comprises a control module according to the above aspects, wherein the ESL is configured to: receive, via the communication module, the ESL update request from the control module of the label printing apparatus; update the second item data stored in the memory according to the at least one change indicated in the ESL update request; display an indication of the updated second item data on the display; and responsive to the item data being updated, communicate an acknowledgement to the control module of the label printing apparatus.

According to another aspect there is provided a computer-implemented method for synchronising a label printing apparatus with an electronic shelf label (ESL), the method comprising: storing, locally to the label printing apparatus, item data associated with an item and shelf label data indicative of an ID of an electronic shelf label (ESL) for the item; receiving, from an external device, an update request to make at least one change to the item data; communicating an ESL update request to the ESL indicated in the shelf label data to make the at least one change at the ESL; updating the item data according to the update request; determining if the ESL has been updated in dependence on whether an acknowledgement is received from the ESL; and if the ESL has not been updated, outputting an alert signal to indicate that the ESL is out of sync with the label printing apparatus.

According to a further aspect there is provided a computer readable storage medium including instructions to perform a method comprising: storing, locally to the label printing apparatus, item data associated with an item and shelf label data indicative of an ID of an electronic shelf label (ESL) for the item; receiving, from an external device, an update request to make at least one change to the item data; communicating an ESL update request to the ESL indicated in the shelf label data to make the at least one change at the ESL; updating the item data according to the update request; determining if the ESL has been updated in dependence on whether an acknowledgement is received from the ESL; and if the ESL has not been updated, outputting an alert signal to indicate that the ESL is out of sync with the label printing apparatus.

BRIEF DESCRIPTION OF THE DRAWINGS

One or more examples will now be described, by way of example only, with reference to the accompanying drawings, in which.

DETAILED DESCRIPTION

Examples disclosed herein relate to a control module for a label printing apparatus. The control module is arranged to manage the updates for item data stored locally at the label printing apparatus and item data displayed at an electronic shelf label (ESL) in order to detect inconsistencies between the label printing apparatus and the ESL.

Figure 1:
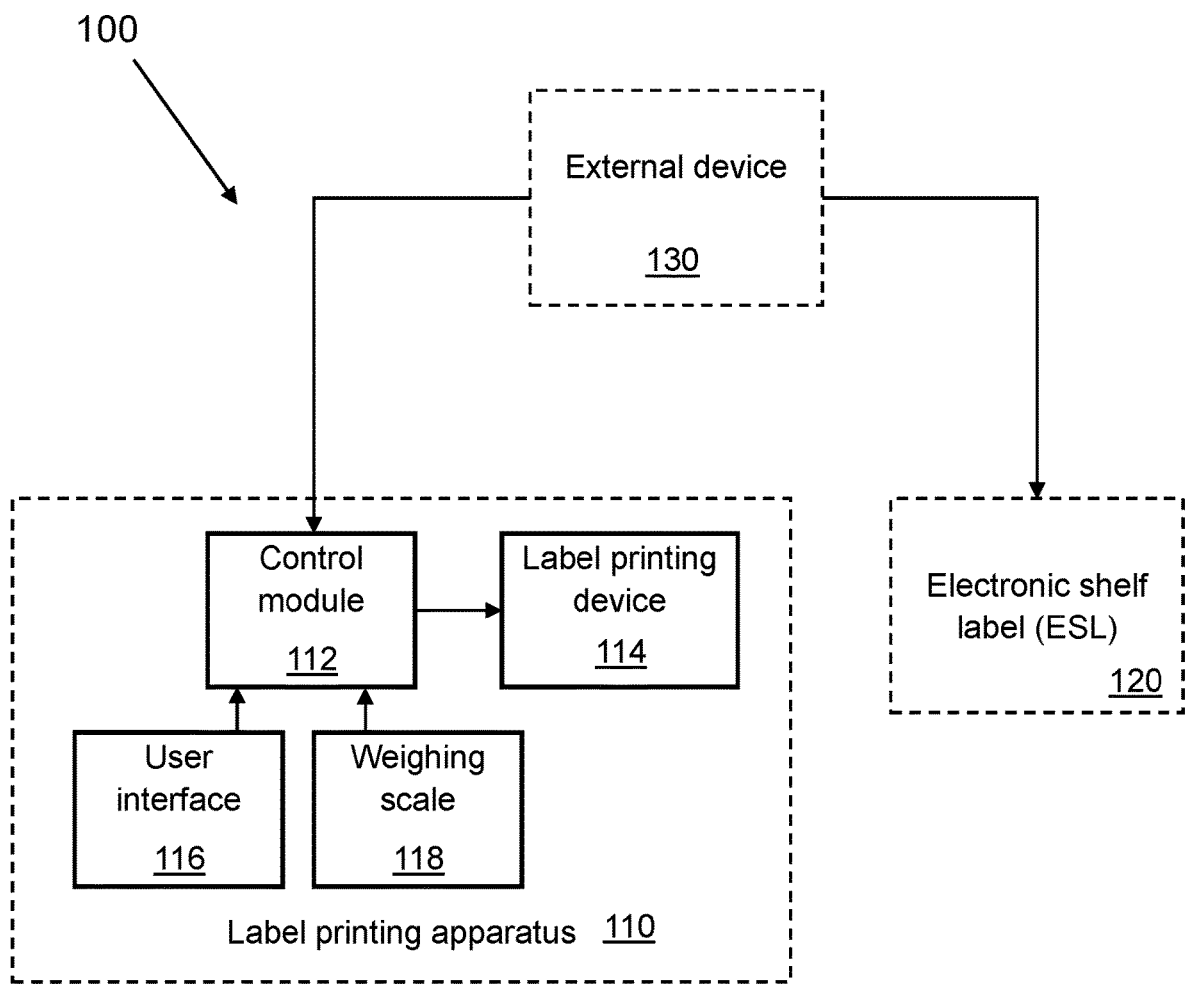
FIG. 1 shows an example of a label printing system according to the prior art.

With reference to FIG. 1, there is shown a label printing system 100 according to the prior art. An electronic shelf label (ESL) 120 is situated in a retail outlet associated with an item for sale. The ESL 120 is typically disposed adjacent to a stock of the item, for example on or proximal to a shelf or a container holding a stock of the item. The ESL 120 is an electronic device comprising a display arranged to display item data associated with the item, such as a price per unit, an item type, and allergen information for the item. The ESL 120 is communicably coupled to at least one external device 130, typically via wireless communication. In this way, updated item data to be displayed can be transmitted to the ESL 120 from the external device 130. Typically, the item is a loose item which is displayed in a bulk container adjacent to the ESL 120.

The label printing system 100 further comprises a label printing apparatus 110 for printing an information label for the item. A customer can decant a quantity of the item and package the quantity into a container, such as a refillable container, for purchase. The label printing apparatus 110 comprises a label printing device 114 configured to print an information label to reflect the quantity of the item packaged by the customer. An "information label" according to the present disclosure may be any label displaying information associated with the quantity of the item packaged, such as a weight of the packaged item, a volume of the packaged item, or a total price of the packaged item. The information label may comprise a machine readable code, such as a QR code, bar code or the like encoding some of the item data. The printed information label may be affixable to the container used by the customer for ease of scanning at the point of sale.

The label printing apparatus 110 comprises a control module 112 for communicating a print signal to the label printing device 114 to control the label printing device 114 to print the information label. The control module 112 comprises a memory configured to store item data associated with an item. The item data may include the same item data as displayed on the ESL 120, for example, a price per weight of the item.

The label printing apparatus 110 comprises a user interface 116. The user interface 116 may be for example a touch screen, keyboard or the like arranged to receive a user input. A customer provide an input at the user interface 116 to request the printing of an information label for the item. The user interface 116 then communicates a label print request signal to the control module 112. The user interface 116 may be local to the label printing apparatus 110, or the user interface 116 may be provided on an external computing device associated with the user, such as a mobile device, laptop, or tablet. The user interface 116 may thus be operatively connected to the control module 112 via wireless communication, such as Wi-Fi, Bluetooth, NFC or the like. The label print request signal comprises an indication of the item for which a label should be printed. The control module 112 is then arranged to retrieve the item data associated with the indicated item. The label printing apparatus 110 also comprises a weighing scale 118 arranged to weigh the item packaged by the customer and communicate weight data to the control module 112 indicating the weight of the item. The control module 112 may then determine the contents of the information label in dependence on the weight data and the item data. For example, a machine readable code such as a barcode may be constructed by the control module 112 to reflect the total cost of the item in dependence on the weight indicated by the weight data and the price per weight indicated by the item data.

The item data associated with the item may be periodically updated, for example to reflect a new price per unit for the item, or to reflect new ingredients, allergens, or the like. The updates associated with the item data are typically managed by an external device or devices 130. The external device(s) 130 may comprise one or more remote computing devices such as a server computer or collection of server computers. The external device(s) 130 may be associated with a plurality of ESLs 120 and label printing apparatuses 110 and be arranged to manage the information stored at each ESL 120 and label printing apparatus 110. The item data for a given item is stored both at the ESL 120 associated with that item for display to the customer and stored at the control module 112 of the relevant label printing apparatus 110. Thus, when the item data for a given item is changed, both the information stored at the control module 112 of the label printing apparatus 110 and the ESL 120 need to be updated. Thus, the external device 130 is communicably connected to each of the control module 112 and the ESL 120. When the external device 130 determines or receives updated item data for the item, the external device 130 is arranged to communicate the updated item data to each of the control module 112 and the ESL 120.

A problem may arise when the ESL 120 malfunctions and fails to perform the update. Thus, the ESL 120 may be arranged to display out of date information, such as an out of date price for the item. This is complicated by the fact the label printing apparatus 110 may have updated successfully. Thus, when the customer proceeds to print an information label for their item, the information on the label will conflict with the information displayed to them at the ESL.

According to the present invention, there is thus provided an improved label printing system and control module wherein the problems caused by such conflicts can be mitigated. This is achieved by routing the updates for an ESL through the control module of the associated label printing apparatus, such that the label printing apparatus can monitor whether the ESL has updated and take action to mitigate the conflict if the ESL fails to update.

Figure 2A:
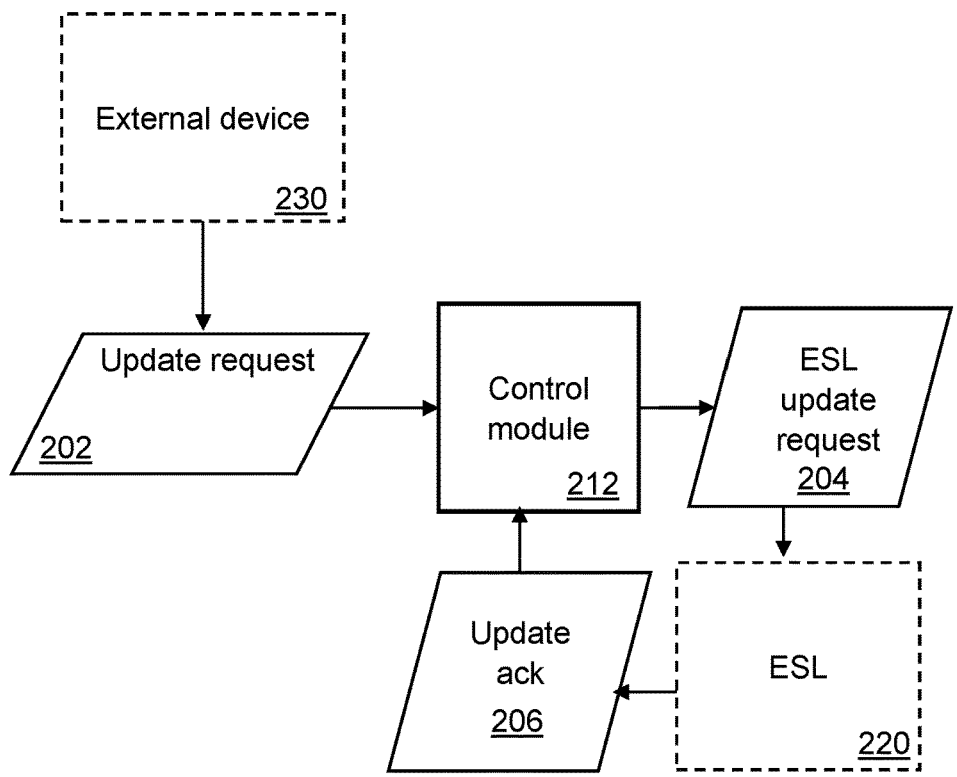
FIG. 2*a* shows a control module for a label printing system according to an embodiment.
Figure 2B:
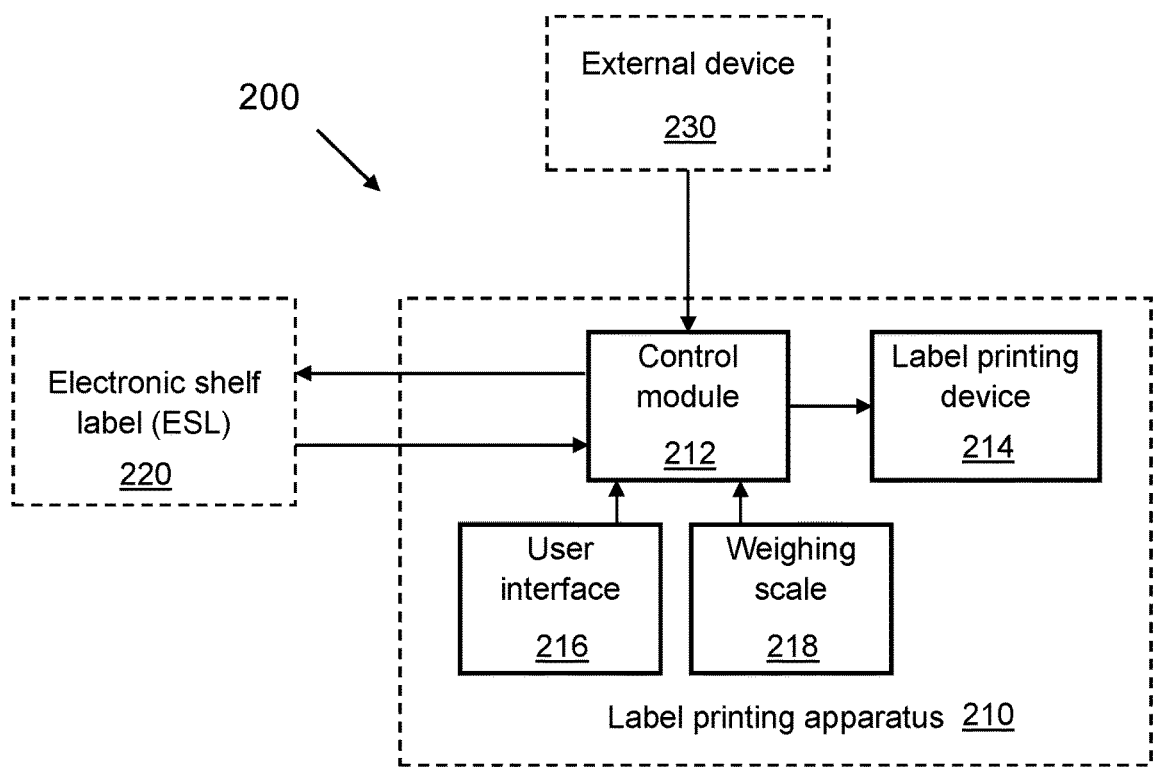
FIG. 2*b* shows a label printing system according to an embodiment.

With reference to FIG. 2A, there is illustrated a control module 212 for a label printing apparatus 210 according to embodiments of the present invention. The label printing apparatus 210 may be implemented in a label printing system 200 as shown in FIG. 2B.

Analogously to the prior art system 100, the label printing system 200 comprises an electronic shelf label (ESL) 220 associated with an item for sale. The ESL 220 is typically disposed on or proximal to a shelf or a container holding a stock of the item. Often, the item is a loose item which is displayed in a bulk container adjacent to the ESL 220. The ESL 220 is an electronic device comprising a display arranged to display item data associated with the item. This item data may comprise one or more of a price per unit, an item type, and allergen information for the item, although this list is non-exhaustive.

The label printing apparatus 210 comprises a label printing device 214 configured to print an information label to reflect the quantity of the item packaged by the customer. As explained, an "information label" according to the present disclosure may be any label displaying information associated with the quantity of the item packaged, such as a weight of the packaged item, a volume of the packaged item, or a total price of the packaged item. The information label may comprise a machine readable code, such as a QR code, bar code or the like encoding some of the item data. The printed information label may be affixable to the container used by the customer for ease of scanning at the point of sale.

The control module 212 comprises a memory configured to store item data associated with the item. The item data may be the same item data as displayed on the ESL 220, for example, one or more of a price per unit, an item type, and allergen information for the item, although this list is non-exhaustive. The control module 212 is arranged to communicate a print signal to the label printing device 214 to control the label printing device 214 to print the information label.

As discussed, the item data associated with the item both at the ESL 220 and the control module 212 may need to be updated, for example to reflect a new price per unit for the item, or to reflect new ingredients, allergens, or the like. The updates associated with the item data are managed by an external device or devices 230. The external device(s) 230 may comprise one or more remote computing devices such as a server computer or collection of server computers.

To implement the updates associated with the item data determined by the external device 230, the control module 212 is connected to the external device 230. The control module 212 and the external device 230 may be connected via a wired connection or via a wireless connection such as Wi-Fi, Bluetooth, NFC or the like. The control module 212 and the external device 230 may be arranged to communicate indirectly over one or more networks such as a local area network (LAN) or the Internet, for example. The control module 212 is arranged to receive an update request 202 from the external device 230. The update request 202 comprises an indication of at least one change to be made to the item data. The control module 212 is then arranged to update the item data stored in the memory according to the update request 202.

In contrast to the prior art system 100, the ESL 220 is connected to the control module 212 of the label printing apparatus. The connection may use a wired network, a wireless network, or any other network known to those in the art. Typically, this connection is via wireless communication over a local area network (LAN) or other type of wireless network. For example, the wireless communication may be a Wi-Fi communication routed through one or more wireless access points (AP). The control module 212 is arranged to communicate an ESL update request 204 to the ESL 220 to make the at least one change at the item data stored at the ESL. Thus, according to the present invention, the control module 212 is arranged to route the update request 202 to the ESL 220, in contrast to the prior art shown in FIG. 1 in which the ESL is directly updated by the external device.

The ESL 220 is then configured to update the item data displayed in accordance with the received ESL update request 204 to reflect the at least one change. If the update is performed successfully, the ESL 220 is configured to communicate an update acknowledgement 206 back to the control module 212. In this way, the control module 212 is informed if and when the ESL 220 has been successfully updated.

Because the updates at both the label printing apparatus 210 and ESL 220 are managed by the control module 212 of the label printing apparatus 210, the label printing apparatus 210 can take mitigating action in an event where the ESL 220 is not successfully updated and thus the item data is not synchronised, as will be explained.

The structure of the control module 212 and the ESL 220 will be described with reference to FIGS. 3 and 4.

Figure 3:
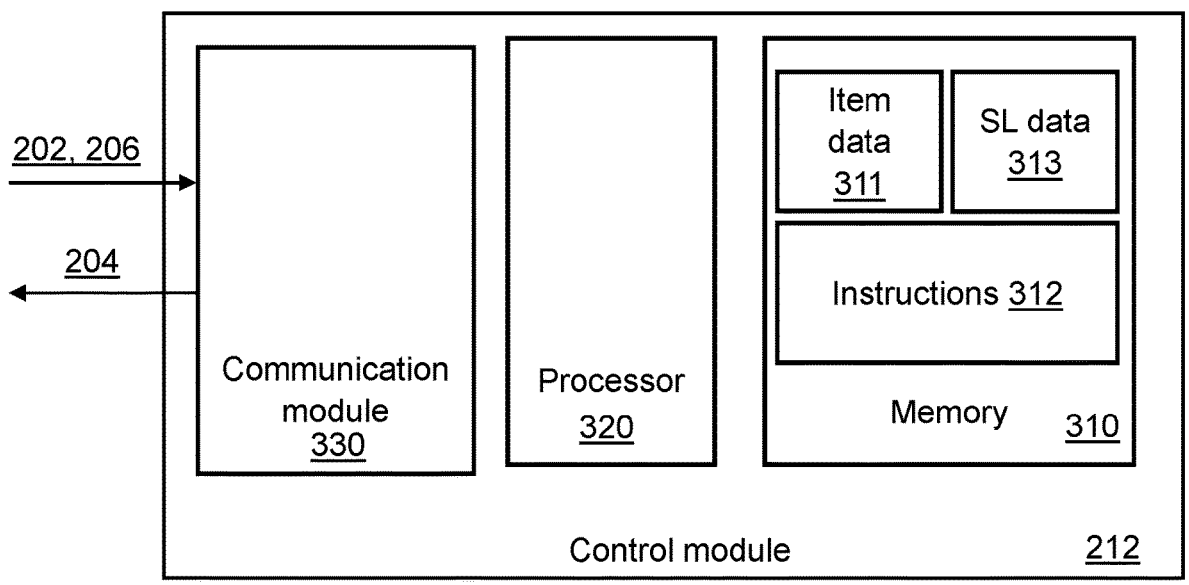
FIG. 3 shows a schematic illustration of a control module for a label printing apparatus according to an embodiment.

The control module 212 is illustrated schematically in FIG. 3. The control module 212 comprises a memory 310 arranged to store the item data 311 associated with the item. The item data 311 may also be referred to throughout the specification as first item data 311 to distinguish from the item data stored at the ESL 220. The item data 311 may comprise one or more of a price per unit, an item type, and allergen information for the item, although this list is non-exhaustive. The memory 310 is also configured to store shelf label data 313 indicative of an ID of the ESL 220 associated with the item. The ID of the ESL 220 may be defined as sufficient information to enable the control module 212 to communicate the ESL update request 204 to the ESL 220. For example, the ID of the ESL 220 may indicate an address of the ESL 220 in a local area network (LAN) to which each of the control module 212 and ESL 220 are connected. The shelf label data 313 and item data 311 are associated in the memory 310. For example, the shelf label data 313 and item data 311 for the item may be associated in a relational database or the like. In some embodiments, the shelf label data 313 and item data 311 may each be linked to an identifier for the item, for example an SKU for the item. In this way, each of the item data 311 and shelf label data 313 may be easily retrieved from the memory 310 when the identifier for the item is provided to the control module 212.

The control module 212 further comprises at least one communication module 330. The at least one communication module 330 is configured to communicate with each of the external device 230 and the ESL 220. The communication module 330 may comprise electrical connections for connecting to a wired network and/or may comprise hardware for performing wireless communication such as Wi-Fi, Bluetooth or the like. The communication module 330 is arranged to receive the update request 202 from the external device 230 and communicate the ESL update request 204 to the ESL 220 indicated in the shelf label data 313. The ESL update request 204 is indicative of the at least one change to be made to the item data as contained in the update request 202. The communication module 330 is also configured to receive the update acknowledgement 206 from the ESL 220 in the event that the ESL 220 is successfully updated.

The control module 212 further comprises at least one processor 320 which is arranged to perform a method according to instructions 312 stored in the memory 310. The processor 320 is configured to update the item data 311 stored in the memory according to the update request 202 received by the communication module 330. In particular, the item data 311 is updated to reflect the at least one change indicated in the update request. For example, the at least one change may relate to a change in price associated with the item.

According to one example, the item data may comprise a SKU for the item, a description of the item, and a cost per unit weight of the item as follows:

Item data = {description = "rice"
SKU - "KT83766GHH"
price per kg = "£2.50"}

The update request may indicate a change in the price per kg of the item from £2.50 to £3.00. Thus, in response to the update request, the processor may be configured to update the item data as follows:

Item data = {description = "rice"
SKU - "KT83766GHH"
price per kg = "£3.00"}

Figure 4:
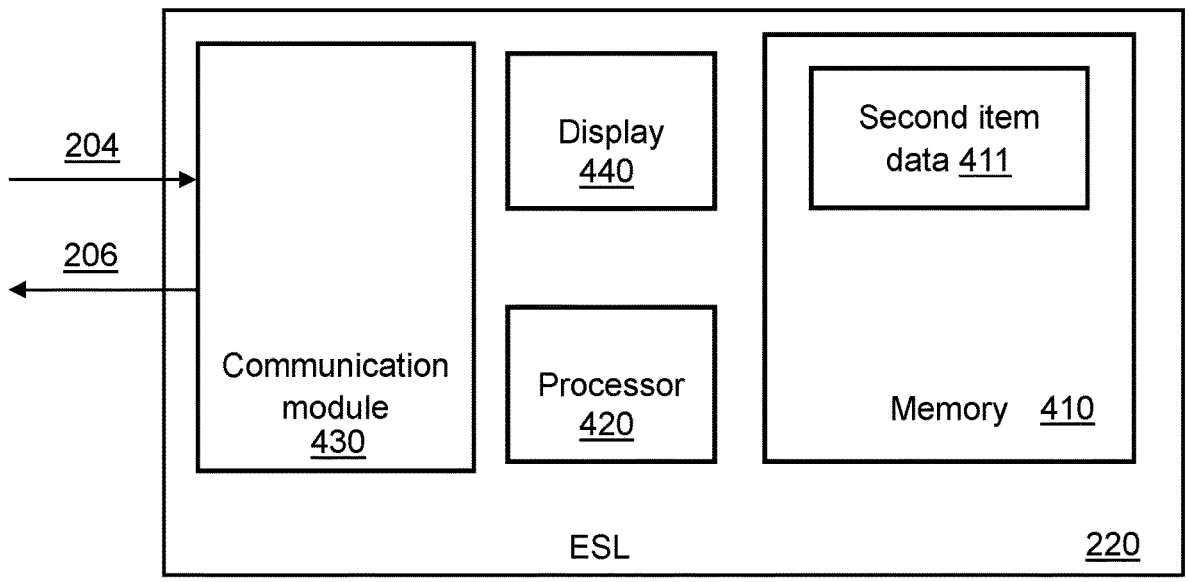
FIG. 4 shows a schematic illustration of an electronic shelf label (ESL) according to an embodiment.

With reference to FIG. 4, there is shown a schematic illustration of the ESL 220. The ESL 220 comprises a memory configured to store item data 411 associated with the item. The item data 411 may also be referred to as second item data 411 to distinguish from the item data 311 stored at the control module 212. The second item data 411 at least partially corresponds to the item data 311. However, the second item data 411 may not be identical to the item data 311. For example, the second item data 411 may comprise additional fields compared to the item data 311, or fewer fields than the item data 311. However, at least some of the fields of the second item data 411 overlap with the item data 311. In this way, at least some updates associated with the item must be applied consistently to both the first item data 311 and the second item data 411. The ESL 220 comprises a display 440, such as an LED display or the like, which is arranged to display an indication of the second item data 411 to customers. For example, the second item data 411 may comprise at least an indication of a price per unit of the item, and the display 440 is configured to display the price per unit, generally when positioned adjacent to a stock of the relevant item.

The ESL 220 further comprises a communication module 430. The communication module 430 is configured to communicate with the control module 212 of the label printing apparatus 210. The communication module 430 may comprise electrical connections for connecting to a wired network and/or may comprise hardware for performing wireless communication such as Wi-Fi, Bluetooth or the like. The communication module 430 is arranged to receive the ESL update request 204.

The ESL 220 further comprises one or more processors 420. In response to receiving the ESL update request 204, the one or more processors 420 are configured to process the ESL update request 204 to identify one or more changes to be made to the second item data 411 and update the second item data 411 according to the identified changes. Taking the example used above, the ESL update request may be indicative of a change in price per kg of the item from £2.50 to £3.00. The one or more processors 420 are configured to identify the relevant portion of the second item data 411, i.e., the price per kg, and update the stored value from £2.50 to £3.00. Furthermore, the one or more processors 420 are configured to update the data displayed on the display 440 to reflect the changes made to the second item data 411.

The ESL 220 is then configured to transmit, via the communication module 430, an update acknowledgement 206 to the control module 212 to indicate that the ESL 220 is successfully updated.

Figure 5:
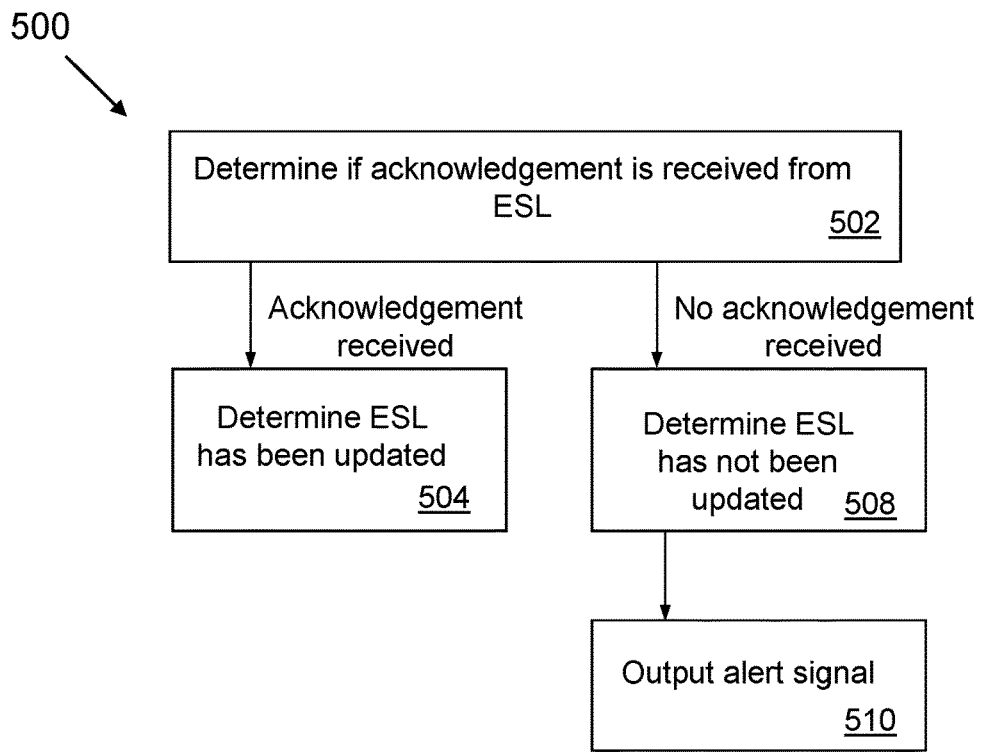
FIG. 5 shows a flow chart illustrating a method according to an embodiment.

With reference to FIG. 5, the control module 212 is configured to perform a method 500 to mitigate the effects of any conflict between the item data 311 and the second item data 411. The steps of the method 500 may be performed at least in part by the processor 320.

Figure 6:
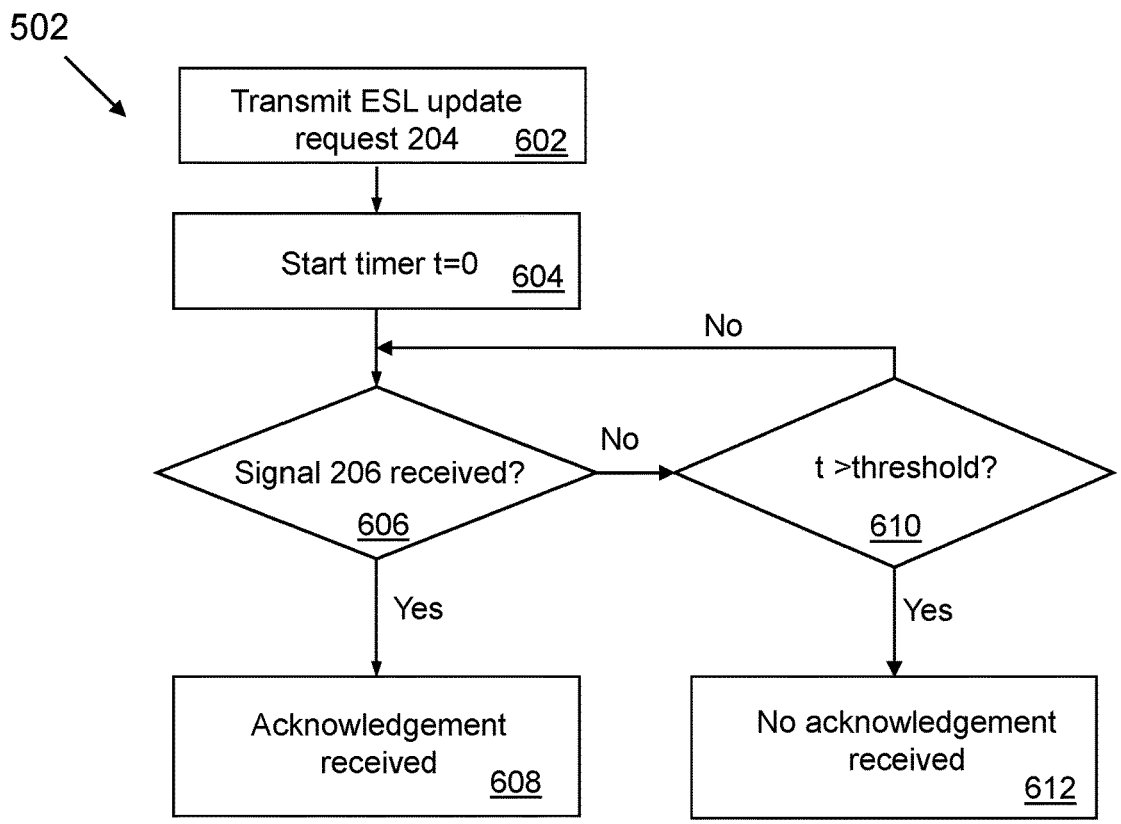
FIG. 6 shows a flow chart illustrating a method according to an embodiment.

In step 502, the control module 212 is arranged to determine whether the acknowledgement 206 is received from the ESL 220. This determination may be made in dependence on a time elapsed since the ESL update request 204 was transmitted. FIG. 6 shows a flow chart of step 502 according to one embodiment. In block 602, the ESL update request 204 is transmitted by the control module 212 to the ESL 220. In response to the ESL update request 204 being transmitted, a timer is started in block 604 and initialised at t=0. The timer then proceeds to increment at predetermined intervals.

In block 606, it is determined whether the signal 206 has been received. If the signal 206 is received, the method proceeds to conclude that the acknowledgement has been received from the ESL in block 608 and step 502 is concluded.

If no signal 206 has yet been received, in block 610 it is determined whether the time elapsed t since the timer was initialised has exceeded a threshold time. If the threshold time has been exceeded, the method proceeds to block 612. It is determined that no acknowledgement has been received from the ESL 220 and step 502 is concluded.

Blocks 606 and 610 are then iterated until either the signal 206 is received or the time elapsed exceeds the threshold time. Although the illustrated embodiment shows block 606 being performed before block 610 at each iteration, it will be appreciated that these blocks may be performed in any order.

With reference again to FIG. 5, if the acknowledgement 206 has been received, the control module 212 determines in step 504 that the ESL has been updated. In this case, the item data 311 stored in the control module 212 is synchronised with the second item data 411 displayed by the ESL 220, and thus no conflict arises.

However, if no acknowledgement 206 is received from the ESL 220, the control module 212 determines in step 508 that the ESL 220 has not been updated. Thus, the updated item data 311 stored in the control module 212 may be out of sync with the second item data 411 displayed by the ESL 220. Thus, the information displayed to the customer at the ESL 220 will be different to the information printed on the label by the printing apparatus 210. This is undesirable as the customer will be unaware of the updated price, allergen information or the like when packaging the item.

If the ESL has not been updated, the method 500 proceeds to step 510 and the control module 212 is arranged to output an alert signal to indicate that the ESL 220 is out of sync with the label printing apparatus 210.

The alert signal output in step 510 may be configured in various ways to mitigate the effects of the conflict.

In some embodiments, the control module 212 may output the alert signal to a remote device, such as the external device 230. The alert signal may thus be communicated wirelessly over one or more networks to which the control module 212 and remote device are connected, such as the Internet or a local area network (LAN). For example, the remote device may be the same external device 230 which manages the updates to the item data. The remote device may particularly be a server computer or collection of server computers responsible for managing the retail environment.

The alert signal may thus function to alert the remote device to the fact the ESL 220 has not updated and thus likely requires maintenance. The alert signal can comprise an indication of the ID of the relevant ESL 220 and a request for maintenance. In this case, the alert signal may be output at any time, such as immediately following the determination that the ESL has not been updated.

Additionally, or alternatively to the alert signal output to the remote device, in step 510 an alert signal may be output to a user of the label printing apparatus. When it is determined that the ESL has not been updated, the control module 212 may store an indication that the ESL has not been updated for the relevant item, and the alert signal may be output to provide an indication to a user who has packaged that item at one or more points during the use of the label printing apparatus 210.

The label printing apparatus 210 can comprise a user interface 216 for interacting with a user, as shown in FIG. 2b. The user interface 216 may comprise one or more components arranged to receive user input and provide output to a user. For example, the user interface 216 may comprise a touch screen, keyboard or the like arranged to receive a user input, and one or more display screens, speakers, or the like to provide visual or audible output to the user. The user interface 216 may be local to the label printing apparatus 210, or the user interface 216 may be provided on an external computing device associated with the user, such as a mobile device, laptop, or tablet. The user interface 216 may thus be operatively connected to the control module 212 either via a wired connection or via wireless communication, such as Wi-Fi, Bluetooth, NFC or the like.

During normal use, the customer brings the packaged item to the label printing apparatus 210 and provides an input at the user interface 216 to request the printing of an information label for the packaged item. The input may comprise an indication of the item, for example a selection of the relevant item from a list provided at the user interface 216. The user interface 216 then communicates a label print request signal to the control module 212. The label print request signal comprises an indication of the item for which a label should be printed. The control module 212 is then arranged to retrieve the item data associated with the indicated item from memory.

The label printing apparatus 210 may also comprise a weighing scale 218 arranged to weigh the item packaged by the customer and communicate weight data to the control module 212 indicating the weight of the item. The control module 212 may then determine the contents of the information label to be printed in dependence on both the weight data and the item data. For example, a machine readable code such as a barcode may be constructed by the control module 212 to reflect the total cost of the item in dependence on the weight indicated by the weight data and the price per weight indicated by the item data. The control module 212 then outputs a print signal to the label printing device 214 to control the label printing device 214 to print the information label.

At any point during this interaction between the user and the label printing apparatus, the control module 212 may be arranged to output the alert signal to the user interface 216 to cause the user interface 216 to output an indication to a user that the ESL 220 is out of sync, or malfunctioning, and thus may not be displaying the correct item data. This indication may be output to the user visually, for example in the form of an alert on a screen of the user interface 216. Alternatively, or additionally, the indication may be output to the user audibly, haptically or via any other form of feedback facilitated by the user interface 216. This indication may be output in response to each input at the user interface 216 to request the printing of an information label for the item. The control module 212 may determine that the ESL 220 associated with that indicated item has not been updated and output the indication to the user.

In some embodiments, the indication may further comprise an indication of the updated item data stored at the control module 212. That is, the control module 212 may be arranged to determine that the indicated item is associated with an out of date ESL and display the correct item data to the user, for example, the correct price per unit. Thus, the user is selectively informed of the updated item data at the label printing apparatus 210 in situations where the ESL 220 is displaying incorrect information.

Additionally, or alternatively to the alert signal output to either the remote device or the user interface, in step 510 the alert signal may be output to prevent operation of one or more parts of the label printing apparatus 210.

As discussed, when it is determined that the ESL has not been updated, the control module 212 may store an indication that the ESL has not been updated for the relevant item. Thus, when a user selects that item during operation of the label printing apparatus 210, the control module 212 may be configured to inhibit one or more operations in order to prevent the printing of an information label for that item. This inhibition may occur at various points in the use of the apparatus 210 as described above. For example, the control module 212 may be arranged to inhibit the output of the print signal to the label printing device 214. Alternatively, or additionally, the label printing apparatus 210 may be arranged to prevent the operation of the weighing scale 218 to weigh the item. Thus, the printing of the information label is prevented, thus preventing the customer from labelling the item for which they have been displayed with out of date information at the ESL 220.

This prevention of operation may be configured to be specific to the item associated with the ESL 220.

Figure 7:
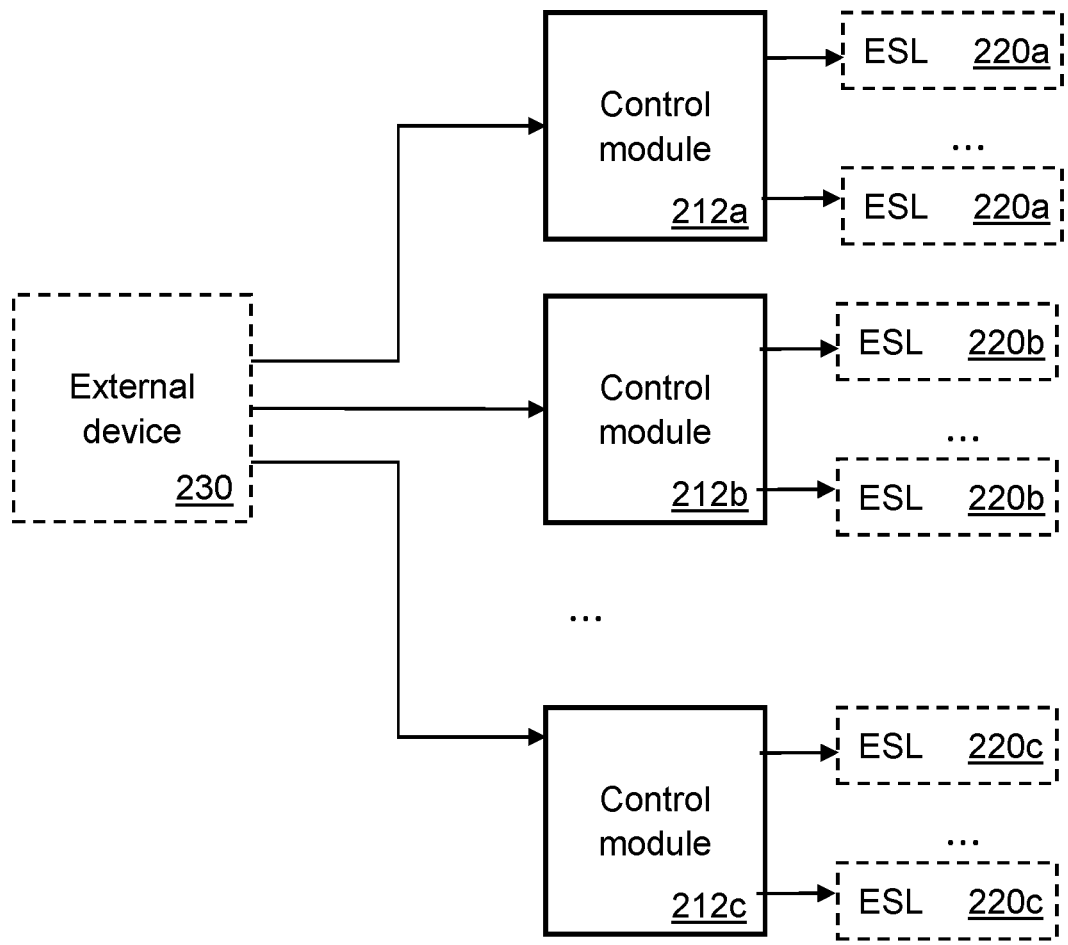
FIG. 7 shows a label printing system according to an embodiment.

With reference to FIG. 7, the label printing apparatus 210 may be associated with a wider retail environment. The external device 230 may manage updates for a plurality of label printing apparatuses and thus may be arranged to communicate updates to each of a plurality of control modules 212a, 212b, . . . , 212c.

Each label printing apparatus, and thus each control module 212a, 212b, 212c may be associated with a plurality of items. That is, each control module may have a corresponding subset of items for which the respective label printing apparatus is arranged to print information labels. Thus, each control module is arranged to store item data corresponding to each of its subset of items. Each of these items is associated with a corresponding ESL 220 for which shelf label data is stored at the control module. Thus, each control module 212a, 212b, 212c is arranged to manage the updates for a corresponding set of ESLs 220a, 220b, 220c. That is, a first control module 212a is arranged to manage the updates for a first set of ESLs 220a corresponding to the set of items for which the first control module 212a is arranged to store item data. Likewise, a second control module 212b is arranged to manage the updates for a second set of ESLs 220b, and a third control module 212c is arranged to manage the updates for a third set of ESLS 220c.

Thus, with reference to the schematic of FIG. 2a and the methods illustrated in FIGS. 5 and 6 and associated description, these processes may be performed by the respective control module 212a, 212b, 212c to manage the updates for each ESL 220a, 220b, 220c associated with that control module. The updates for each ESL may be managed independently, and thus any alert signal which is output may be specific to that ESL or corresponding item for which the ESL has not been updated. In particular, if an alert signal is output to prevent operation of one or more parts of the label printing apparatus 210, this prevention of operation may be specific to the item associated with the ESL which has been determined as not updated. Thus, the control module 212 may control the label printing apparatus 210 to operate as normal with respect to the printing of information labels for other items not associated with the out of sync ESL.

In summary, the present invention provides a means of operating a label printing system and control module wherein the problems caused by conflicts between an ESL and a label printing apparatus can be mitigated by routing the updates for an ESL through the control module of the associated label printing apparatus. Thus, the label printing apparatus can monitor whether the ESL has updated and take action to mitigate the conflict if the ESL fails to update, by requesting maintenance, alerting the user, or preventing the printing of inconsistent labels.

The memory 310, 410 as referenced herein may each comprise a computer-readable storage medium (e.g. a non-transitory, non-volatile or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM and EEPROM); flash memory; or electrical or other types of medium for storing such information/instructions.

The one or more processors 320, 420 may each comprise one or more electronic processors (e.g., a microprocessor, a microcontroller, an application specific integrated circuit (ASIC), Boolean logic circuitry, etc.) that is configured to execute the stored instructions. The term "controller," "control unit," or "computational device" may be understood to include a single controller, control unit, or computational device, or a plurality of controllers, control units, or computational devices collectively operating to provide the required control functionality.

The set of instructions may be embedded in said one or more electronic processors of the controller; may be stored in a memory or may be provided as software to be executed in the controller. The memory may comprise any suitable memory device and may store a variety of data, data structures, and/or instructions thereon. For example, the memory may store instructions for software, firmware, programs, algorithms, scripts, applications that may control or cause suitable apparatus to perform all or part of the methodology described herein.

All disclosed features may be combined in any combination, except combinations where at least some of such features are mutually exclusive. Each feature disclosed in this specification may be replaced by alternative features serving the same, equivalent or similar purpose, unless expressly stated otherwise. The invention is not restricted to the details of any foregoing examples. The invention extends to any novel feature or novel combination of features disclosed herein, as defined by the appended claims.

The invention claimed is:

1. A control module for a label printing apparatus, comprising:
   a memory configured to store item data associated with an item and shelf label data indicative of an ID of an electronic shelf label (ESL) for the item;
   at least one communication module configured to:
     receive, from an external device, an update request to make at least one change to the item data, and communicate an ESL update request to the ESL indicated in the shelf label data to make the at least one change at the ESL; and a processor configured to:
  update the item data stored in the memory according to the update request;
  determine if the ESL has been updated in dependence on whether an acknowledgement is received from the ESL within a predetermined time from the communication of the ESL update request and, if the acknowledgement is not received within the predetermined time, determine that the ESL has not been updated; and
  after determining that the ESL has not been updated, control the communication module to output an alert signal to indicate that the ESL is out of sync with the label printing apparatus.

2. The control module of claim 1, wherein if the ESL has not been updated, the communication module is arranged to output the alert signal to a user interface associated with the label printing apparatus, wherein the alert signal is configured to cause the user interface to output an indication to a user that the ESL is out of sync with the label printing apparatus.

3. The control module of claim 1, wherein the communication module is arranged to output the alert signal to a remote device.

4. The control module of claim 3, wherein the alert signal comprises an indication of the ID of the ESL, wherein the alert signal is configured to provide a request for maintenance at the indicated ESL.

5. The control module of claim 1, wherein the processor is configured to determine that the ESL has been updated if the acknowledgement is received within the predetermined time.

6. The control module of claim 1, wherein the shelf label data comprises an address associated with the ESL in a local area network, and wherein the communication module is configured to communicate the ESL update request to the address via the local area network.

7. The control module of claim 1, wherein the item data is indicative of one or more of: a price of the item, a list of ingredients in the item, or allergen information for the item.

8. The control module of claim 7, wherein the update request is indicative of at least one change to the price of the item, the list of ingredients in the item, or the allergen information for the item.

9. The control module of claim 1, wherein the at least one communication module is configured to:
  receive a label generation request indicating the item to be labelled; and
  communicate a print signal to a label printing device to cause the label printing device to print an information label for the item in dependence on the updated item data.

10. The control module of claim 9, wherein the processor is configured to inhibit the communication of the print signal if the ESL has not been updated.

11. The control module of claim 9, wherein the communication module is configured to receive item weight data indicative of a measured weight of the item from a weighing scale associated with the label printing apparatus, and wherein the processor is configured to determine a content of the information label in dependence on the item data and the item weight data.

12. A label printing apparatus comprising:
  the control module of claim 9;
  an input device configured to receive a user input and transmit the label generation request to the control module in dependence on the received user input; and
  a label printing device communicably coupled to the control module, the label printing device configured to receive the print signal from the control module and print an information label in dependence on receipt of the print signal.

13. The label printing apparatus of claim 12, wherein the label printing apparatus comprises a weighing scale.

14. A label printing system for an item in a retail setting, the label printing system comprising:
  an electronic shelf label (ESL) associated with an item, wherein the electronic shelf label (ESL) comprises a communication module, a memory for storing second item data associated with the item, and a display for displaying an indication of the second item data; and
  a label printing apparatus, wherein the label printing apparatus comprises a control module according to claim 1;
  wherein the ESL is configured to:
    receive, via the communication module, the ESL update request from the control module of the label printing apparatus;
    update the second item data stored in the memory according to the at least one change indicated in the ESL update request;
    display an indication of the updated second item data on the display; and
    responsive to the item data being updated, communicate an acknowledgement to the control module of the label printing apparatus.

15. A computer-implemented method for synchronising a label printing apparatus with an electronic shelf label (ESL), the method comprising:
  storing, locally to the label printing apparatus, item data associated with an item and shelf label data indicative of an ID of an electronic shelf label (ESL) for the item;
  receiving, from an external device, an update request to make at least one change to the item data;
  communicating an ESL update request to the ESL indicated in the shelf label data to make the at least one change at the ESL;
  updating the item data according to the update request;
  determining if the ESL has been updated in dependence on whether an acknowledgement is received from the ESL within a predetermined time from communication of the ESL update request, and, if the acknowledgement is not received within the predetermined time, determining that the ESL has not been updated; and
  after determining that the ESL has not been updated, outputting an alert signal to indicate that the ESL is out of sync with the label printing apparatus.

16. A non-transitory computer readable data storage medium storing computer-readable instructions which, when executed by one or more processors, perform a method comprising:
  storing, locally to the label printing apparatus, item data associated with an item and shelf label data indicative of an ID of an electronic shelf label (ESL) for the item;
  receiving, from an external device, an update request to make at least one change to the item data;
  communicating an ESL update request to the ESL indicated in the shelf label data to make the at least one change at the ESL;
  updating the item data according to the update request;

determining if the ESL has been updated in dependence on whether an acknowledgement is received from the ESL within a predetermined time from communication of the ESL update request and, if the acknowledgement is not received within the predetermined time, determining that the ESL has not been updated; and after determining that the ESL has not been updated, outputting an alert signal to indicate that the ESL is out of sync with the label printing apparatus.

* * * * *